US006979198B2

(12) United States Patent
Krieger

(10) Patent No.: US 6,979,198 B2
(45) Date of Patent: Dec. 27, 2005

(54) LEARNING METHOD AND APPARATUS

(75) Inventor: Paula R. Krieger, Joseph, OR (US)

(73) Assignee: Daily Window, L.L.C., Joseph, OR (US)

( * ) Notice: Subject to any disclaimer, the term of this patent is extended or adjusted under 35 U.S.C. 154(b) by 0 days.

(21) Appl. No.: 10/797,808

(22) Filed: Mar. 9, 2004

(65) Prior Publication Data

US 2005/0202378 A1 Sep. 15, 2005

(51) Int. Cl.⁷ .............................................. G09B 19/00
(52) U.S. Cl. ...................................................... 434/156
(58) Field of Search ................................ 434/156, 159, 434/172, 188, 365, 433; 206/579

(56) References Cited

U.S. PATENT DOCUMENTS

| 4,022,261 | A | * | 5/1977 | Russell | 150/129 |
| 4,685,570 | A | * | 8/1987 | Medow | 206/579 |
| 4,944,968 | A | * | 7/1990 | Wagner | 428/13 |
| 4,974,983 | A | * | 12/1990 | Givati | 402/80 R |
| 5,000,543 | A | * | 3/1991 | Curtin | 349/474 |
| 5,533,902 | A | * | 7/1996 | Miller | 434/112 |
| 5,704,067 | A | * | 1/1998 | Brady | 2/170 |
| 5,788,503 | A | * | 8/1998 | Shapiro et al. | 434/172 |
| 6,142,473 | A | * | 11/2000 | Bryant | 273/244 |
| 6,279,747 | B1 | * | 8/2001 | Zegarra | 206/579 |
| 6,390,715 | B1 | * | 5/2002 | Gerbasi | 402/79 |
| 6,626,675 | B1 | * | 9/2003 | Webber | 434/156 |
| 6,723,906 | B2 | * | 4/2004 | Bourgoin | 84/411 R |

* cited by examiner

*Primary Examiner*—Kurt Fernstrom
(74) *Attorney, Agent, or Firm*—Drummond & Duckworth

(57) ABSTRACT

A method of learning and apparatus useful therein in which a card carrying a visual representation of a concept to be learned in displayed through a window carried on a common-use article, such as luggage items, decorative desk or table accouterments.

3 Claims, 2 Drawing Sheets

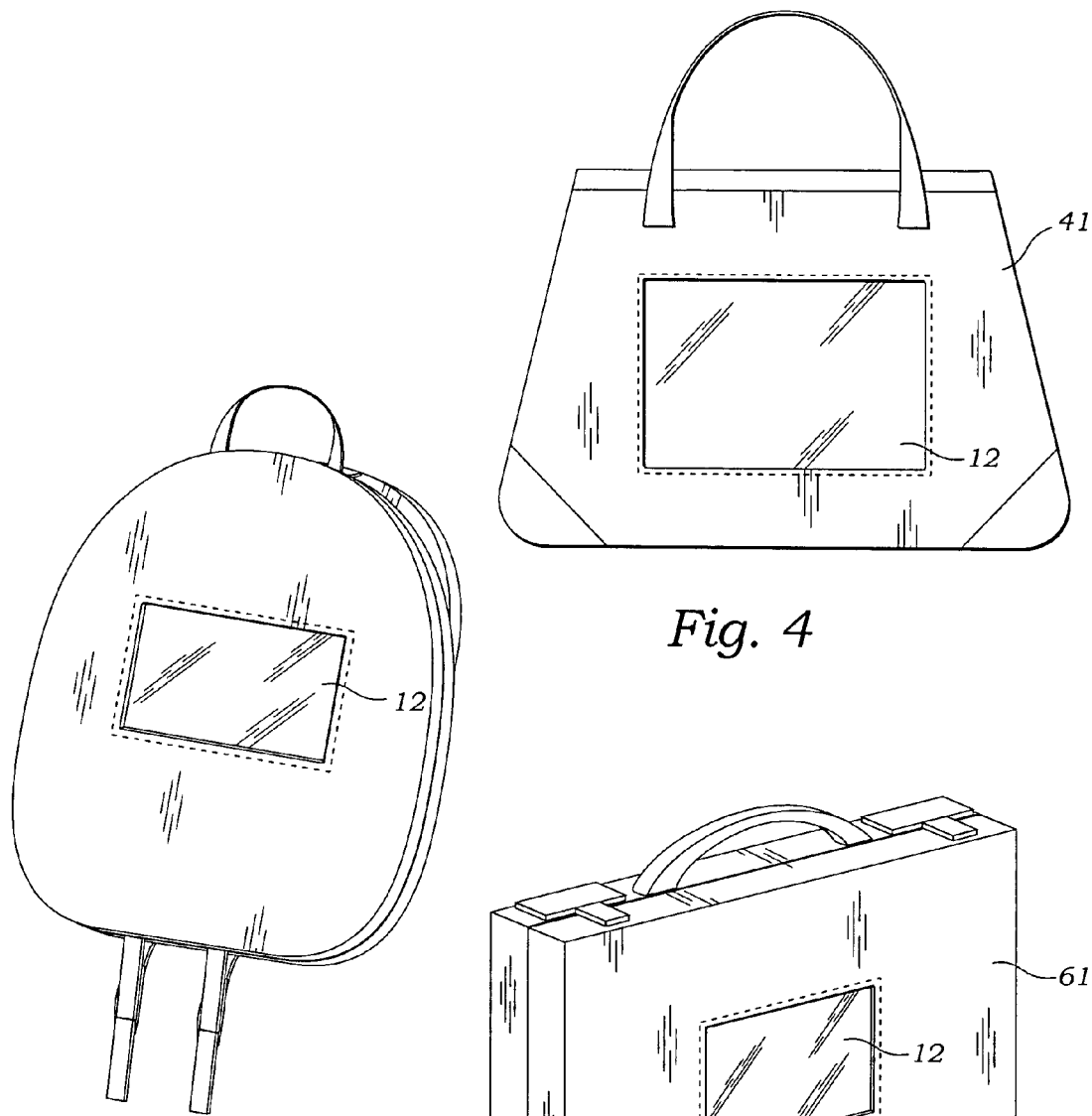
Fig. 4
Fig. 5
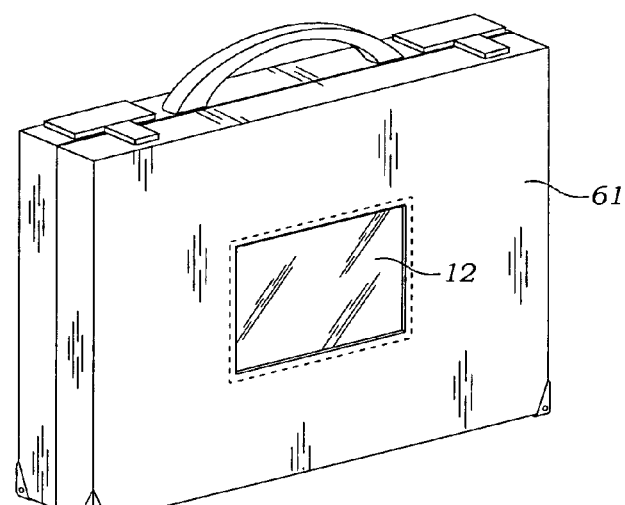
Fig. 6

LEARNING METHOD AND APPARATUS

FIELD OF THE INVENTION

This invention pertains to a reinforced, self-instructional learning method and to apparatus useful in the practice of such method.

More particularly, the method is specially adapted to instilling in the mind of the user a series of concepts, by repetitive sequential visual exposure to a series of visible representations of each of a plurality of such concepts.

These and other, further and more specific aspects of the invention will be apparent to those skilled in the art from the following description thereof, taken in conjunction with the drawings, in which:

BRIEF DESCRIPTION OF THE DRAWINGS

FIG. 4 is an exterior view of a purse or handbag, embodying the invention;

FIG. 5 is an exterior view of a backpack, embodying the invention;

FIG. 6 depicts an exterior view of an attache case, embodying the invention;

BACKGROUND OF THE INVENTION AND THE PRIOR ART

Figures 1, 2, 3:
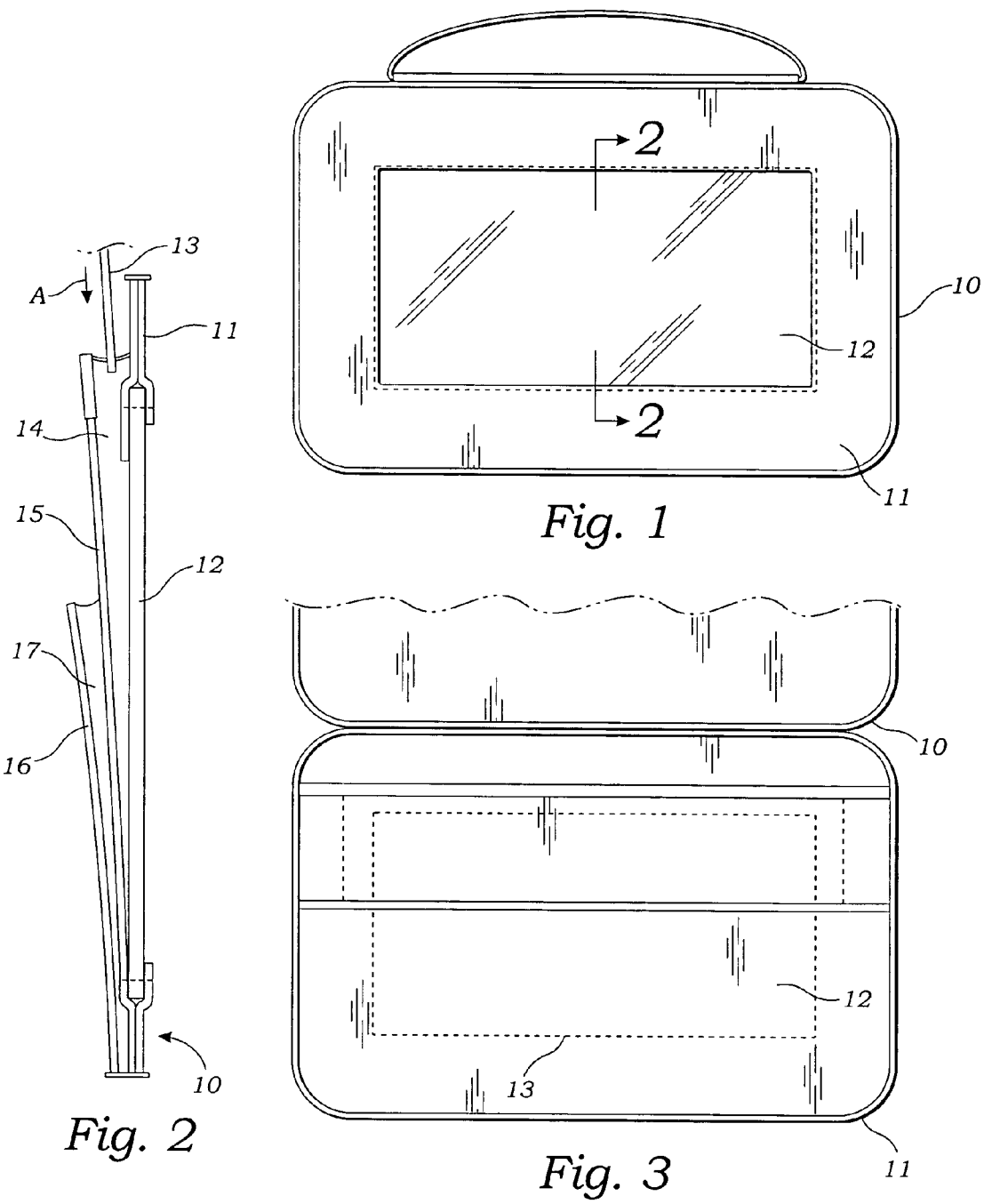
FIG. 1 depicts a typical book carrier embodying various elements of apparatus of the invention.
FIG. 2 is a sectional view of the apparatus of FIG. 1, taken along section line 2—2 thereof.
FIG. 3 depicts the book carrier or briefcase of FIGS. 1 and 2, opened to show the details of the interior thereof.

Professional educators have long understood that an effective way of teaching a body of information to a student is to break the information into smaller discrete elements and present these elements repetitively and sequentially to the student. Indeed, the repetitive use of so-called "flash cards" as self-education tools is a common example of this technique.

Moreover, it is known to provide common personal use items, such as luggage and the like with windows for the display of information such as the owner's name and address or decorative items, such as photographs, drawings, etc. For example, it is well known to provide a suitcase, attache case, computer carrying case, etc. with an integral pocket having a transparent side, into which one can insert a business card or equivalent card with written information indicating the owner's name, address, employer, etc.

The present invention uses the general educational technique of repetitive self-instruction, employing a new combination of physical elements, which provides a convenient and effective method for enhancing learning of multiple concepts by a user.

BRIEF DESCRIPTION OF THE INVENTION

Briefly, my reinforced-learning system employs a series of visible representations of a series of concepts to be learned by the user by repetitive visual exposure of the representations to the user. A common-use article is provided having a visible surface. A transparent window is carried on the visible surface of the common-use article. A pocket is carried by the article behind the window. A plurality of cards are provided, each carrying at least one of the visible representations. These cards are shaped and sized to be inserted into the pocket with the representation is carried by the card is visible through the window.

Using this apparatus, the method of instilling these concepts in the mind of the user comprises inserting a first one of the cards into the pocket behind the window, repetitively observing the first card through the window, removing the first card and replacing it with another of the plurality of cards and then repeating this process of inserting a new card and repetitively observing it by the user.

As used herein the term "common-use article" includes a wide variety of items that a user has occasion to observe at multiple times during the course of the user's normal activities in public or business settings, outside the home. For example, such items include normally portable items such as purses, briefcases, book covers, backpacks, handbags, attache cases and the like.

"Visible representation" means indicia carried on a card suitable for insertion behind the window on the common use article. The indicia can be handwritten or printed and can include words, pictures, scientific formulae and combinations thereof suitable to visibly represent the concept to be impressed on the brain of the user of the common-use article.

DETAILED DESCRIPTION OF THE INVENTION AND THE PRESENTLY PREFERRED EMBODIMENTS

Turning now to the drawings, in which like reference characters identify the same elements in the several views, FIGS. 1–3 depict a book cover 10, one side 11 of which is provided with a window 12 sewn or otherwise permanently affixed to the side 11. A card 13 is inserted downwardly in the direction of the arrow A into the pocket 14 carried by the cover 10, behind the window 12, 50 that indicia on the face of the card is visible through the window 12. The card 13 (shown by dashed lines in FIG. 3) is retained in place behind the window 12 by the pocket forming member 15, also carried by the cover 10. Optionally, the cover 10 can also include a second pocket forming member, which forms a pocket 17, which is used to store other cards (not shown) which are ultimately placed behind the window 12 to display further concepts represented by visible representations.

FIGS. 4–6 illustrate other common items which are constructed to embody the apparatus of the invention and which are used according to the method of the invention. FIG. 4 depicts a typical ladies purse or handbag 41. FIG. 5 depicts a backpack 51. FIG. 6 depicts an attache case. Each of these common use items is provided with the window and the interior details are the same as shown in FIGS. 2–3.

I claim:

1. A reinforced-learning method for instilling a plurality of concepts in the mind of a user, said method comprising:
   (a) providing a plurality of cards, each said card carrying a visible representation of one of said plurality of concepts;
   (b) inserting a first one of said cards into a pocket carried by a normally portable common personal-use article that a user has occasion to observe at multiple times during the course of the user's normal public or business activities outside the home,
      said pocket having a transparent window visible to said user formed therein,
      said pocket be sized to accommodate one of said cards;
   (c) repetitively observing said first card and replacing it with another of said plurality of cards; and (d) repeating steps (b)–(d), using other cards of said plurality of cards.

2. The method of claim 1, wherein said personal-use article is a member selected from the group consisting of purses, briefcases, book covers, backpacks, handbags and attache cases.

3. A reinforced-learning system employing a series of printed visible representations of concepts to be learned by repetitive visual representations of visible representations of concepts to be learned by repetitive visual exposure thereto, said system comprising:

(a) a normally portable common personal use article that a user has occasion to observe at multiple times during the course of the user's normal public or business activities outside the home, having a visible surface, wherein said personal use article is a member selected from the group consisting of purses, briefcases, book covers, backpacks, handbags and attache cases;

(b) a transparent window on said surface;

(c) a pocket carried by said article behind said window; and (d) a plurality of cards, each carrying at least one of said representations, said cards sized for insertion into said pocket such that said one representation is visible through said transparent window.

* * * * *